United States Patent [19]
Ferris et al.

[11] 3,944,375
[45] Mar. 16, 1976

[54] FIFTH WHEEL PLATE ASSEMBLY

[75] Inventors: Ray L. Ferris, Thornton, Ill.; Walter J. Marulic, Gary, Ind.

[73] Assignee: Pullman Incorporated, Chicago, Ill.

[22] Filed: Feb. 10, 1975

[21] Appl. No.: 548,507

[52] U.S. Cl. ............... 403/13; 403/317; 248/119 S
[51] Int. Cl.² ................................... F16D 9/00
[58] Field of Search ............. 403/13, 14, 317; 248/119 S; 105/368 S; 280/433

[56] References Cited
UNITED STATES PATENTS

| | | | |
|---|---|---|---|
| 2,880,681 | 4/1959 | Markestein et al. | 105/368 S |
| 3,003,434 | 10/1961 | Clejan | 105/368 S |
| 3,087,748 | 4/1963 | Livelsberger et al. | 248/119 S |
| 3,145,006 | 8/1964 | Robinson et al. | 105/368 S |
| 3,234,893 | 2/1966 | Sweda | 105/368 S |
| 3,602,469 | 8/1971 | Hammonds | 403/325 |
| 3,751,079 | 8/1973 | Marulic et al. | 403/27 |

Primary Examiner—Andrew V. Kundrat
Attorney, Agent, or Firm—Richard J. Myers

[57] ABSTRACT

A fifth wheel plate assembly for a trailer hitch for securing trailers to railway flat cars includes a top plate having an opening in which a movable clamp or lock jaw is supported for grasping and locking the kingpin of a trailer to the fifth wheel. The lock jaw is provided with slidable extensions including transversely extending brackets between which a threaded follower is positioned, the same in turn being actuated by means of a lock screw mounted for rotation on the fifth wheel assembly. The follower in response to rotation of the screw actuates the jaw and slide assembly for moving the same between kingpin engaging and disengaging positions. A plurality of concavo-convex washers are supported between the follower and one of the brackets thus permitting a limited longitudinal movement in one direction of slide assembly and jaw to cushion certain impact stresses exerted on the kingpin contained between the clamping members and thereby preventing damage to the drive screw and associated structure.

8 Claims, 6 Drawing Figures

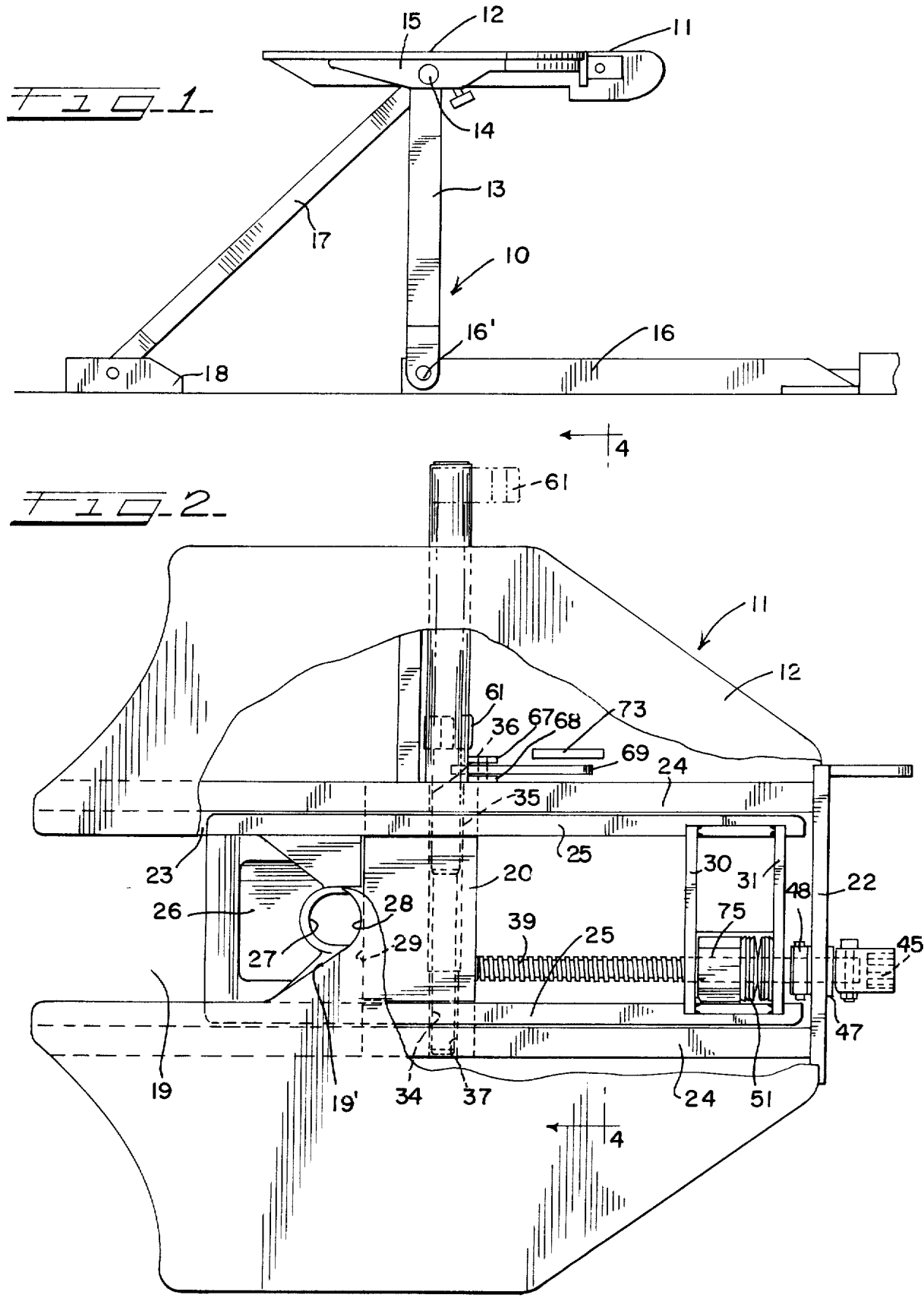

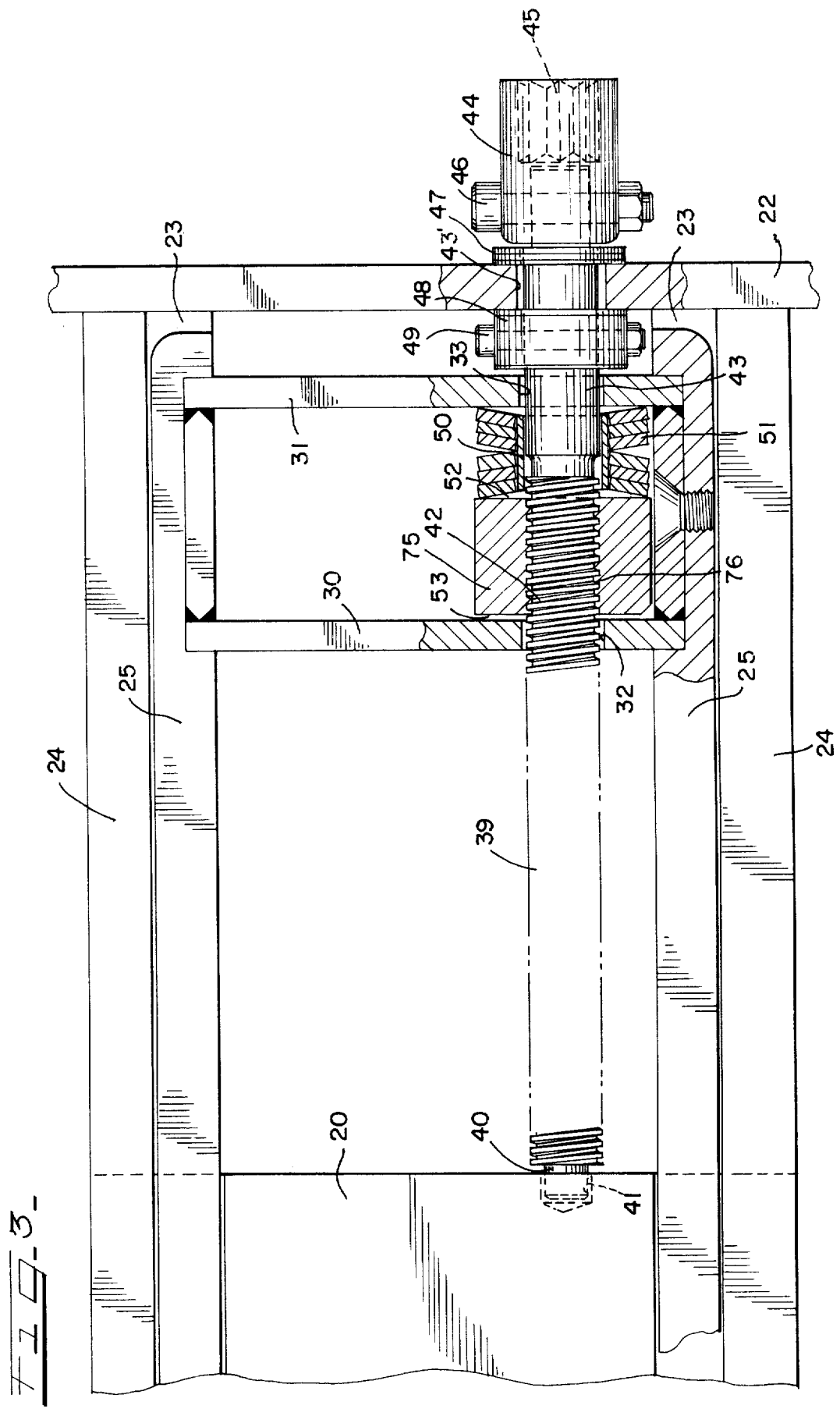

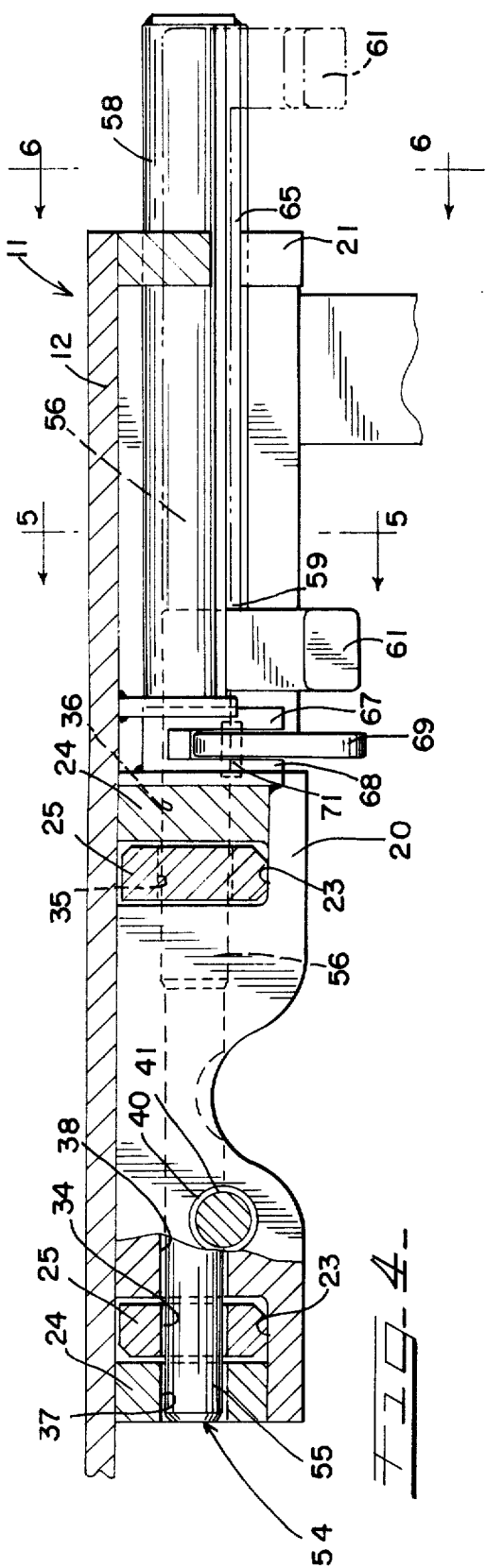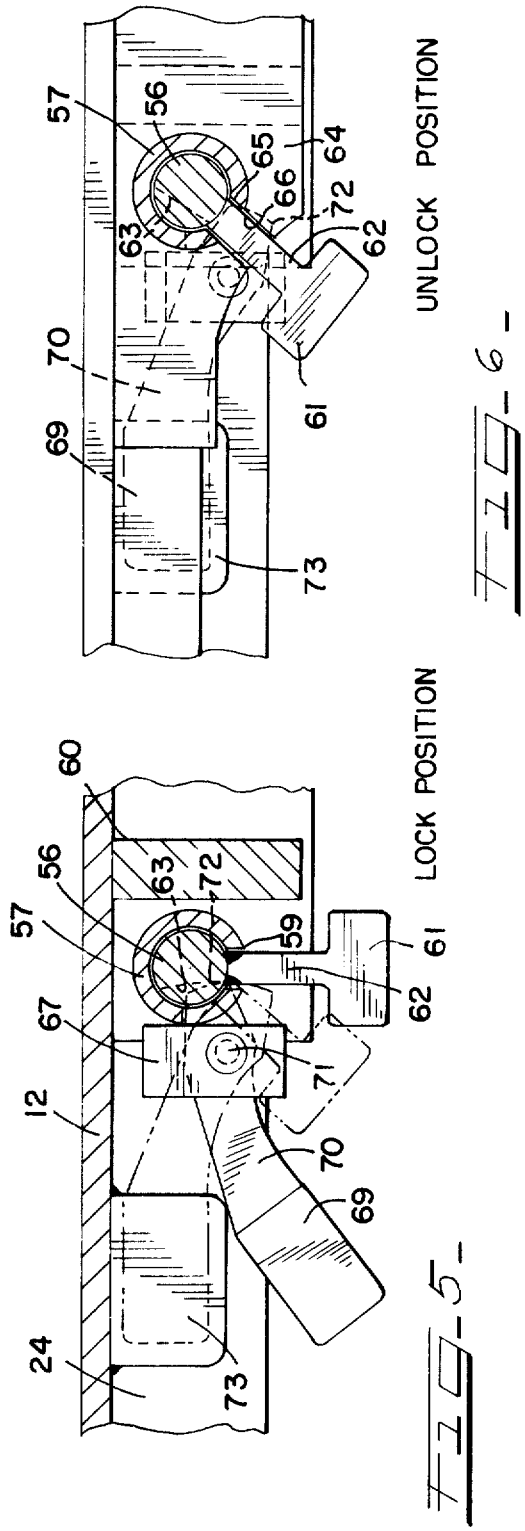

FIFTH WHEEL PLATE ASSEMBLY

BACKGROUND OF THE INVENTION

1. Field of the Invention

The invention pertains to fifth wheel assemblies and particularly to the type of fifth wheel plate which is utilized in connection with a trailer hitch for connecting trailers on railway flat cars.

2. Description of the Prior Art

The prior art over which the present invention is an improvement is disclosed is U.S. Pat. No. 3,751,079 patented Aug. 7, 1973.

SUMMARY OF THE INVENTION

It is a prime object of the present invention to provide an improved fifth wheel plate for securing the kingpins of trailers which are carried on trailer hitches during trailer-on-flat car operations. A more specific object is the provision of an improved fifth wheel assembly wherein the drive screw and associated parts are protected against damage which may occur during high impact stresses resulting from conventional railroad operations. In the present invention the fifth wheel includes structure more specifically described in the aforementioned patent and further includes a resilient cushioning arrangement which is provided to protect the drive screw normally utilized in moving a clamping block into engagement with the kingpin of a trailer which is carried on a railway flat car. In the present arrangement a slide assembly includes slide members which are supported on the underneath structure of a fifth wheel. The slide assembly has connected thereto a movable clamping block with a surface adapted to engage the kingpin of a trailer for supporting the trailer in a clamped assembly on the flat car. The clamping block is moved between engaging and non-engaging positions by means of a drive screw threaded to a follower, the said follower in turn being held between a pair of laterally extending brackets connected within the slide assembly. The drive screw is mounted for rotation and is secured against longitudinal movement. During rotation of the screw the follower provides for movement of the slide assembly. In the closed position of the clamp blocks any unusual or high stress forces on the kingpin and clamping block provide for limited movement of the slide assembly relative to the substantially rigid drive screw since a plurality of spring-like concavo-convex washers are held between the follower and one of the brackets of the slide assembly.

These and further objects will become more readily apparent from a reading of the following descriptions.

BRIEF DESCRIPTION OF THE DRAWINGS

FIG. 1 is a side elevational view of a trailer hitch of a type adapted to be positioned on a railway flat car for securing trailers thereto;

FIG. 2 is a plan view of a top plate of a fifth wheel for trailer hitches with portions broken away to better illustrate the invention;

FIG. 3 is an enlarged view showing a drive mechanism for actuating a clamping jaw to clamp the kingpin of a trailer;

FIG. 4 is a cross-sectional view taken substantially along the line 4—4 of FIG. 2;

FIG. 5 is a cross-sectional view taken substantially along the line 5—5 of FIG. 4; and FIG. 6 is a cross sectional view taken substantially along the line 6—6 of FIG. 4.

DESCRIPTION OF THE PREFERRED EMBODIMENT

As best shown in FIG. 1 a trailer hitch 10 includes a fifth wheel 11 having a top plate 12. The top plate 12 is supported on an upright pedestal 13 pivotally connected by means of a pivot pin 14 to brackets 15 (only one being shown) projecting downwardly below the top plate 12. The present trailer hitch is of a type which is pivotally supported at the end of a cushioning device 16 carried on the floor of a conventional flat car. The pedestal and trailer hitch assembly may be collapsed and pivoted about the pivot pin 16' of the cushioning unit 16 in a manner which is conventional and is disclosed in the Ferris et al U.S. Pat. No. 3,493,207. The trailer hitch 10 also includes diagonal supports 17 suitably pivotally connected to a pivot bracket 18 adapted to be secured to a railway flat car.

Referring now particularly to the top plate 12 an enlarged slot 19 is provided which terminates at one end thereof and at its other includes diverging gathering surfaces 19'. An enlarged lateral support member 20 is rigidly connected to the underneath surface of the top plate 12 and projects downwardly with respect thereto. The top plate 12 also includes side flanges 21 as best shown in FIG. 4 and an end support member 22 projecting downwardly at one end of the plate 12 as shown in FIG. 2 and a pair of laterally spaced slide supports 23 formed in cutouts of the support member 20 as best shown in FIG. 4. Laterally spaced slide members 25 provide a slide assembly which is guided on the slide supports 23. The slide members 25 at one end are rigidly secured to a jaw or clamping block 26 having an arcuate kingpin engageable surface or socket 27 as best shown in FIG. 2. The kingpin engageable surface 27 is adapted to complement a kingpin receiving surface 28 formed in the top plate 12 at the ends of the diverging surfaces 19'. A vertical face or wall 29 on the block 20 also provides for supporting and locking a trailer connected kingpin (not shown) within the kinpin engageable surface or socket 27. A pair of parallel bars or brackets 30 and 31 connect the other ends of the slide members 25. As best shown in FIG. 4, the slide members 25 are retained on the slide supports 23 by means of parallel stationary guide walls 24. As indicated in FIG. 3 each of the bars 30 and 31 are respectively provided with bores 32 and 33 in longitudinal alignment with each other. As best shown in FIG. 4, one slide member 25 includes a laterally extending bore 34 and the other slide member 25 includes a laterally extending bore 35 with said bores also being in alignment. The guide walls 24 are respectively provided with bores 36 and 37 in turn adapted to be aligned with the bores 34, 35, and elongated bore 38 extending through the support block or member 20.

A drive screw 39 as shown in FIGS. 2 and 3 includes a reduced journal portion 40 received in a aperture 41 provided in the block 20. The drive screw 39 includes a threaded portion 42 connected to a bearing portion 43 projecting through a bore 43' provided in the end support member 22. The portion 43 has connected thereto an operating head 44 provided with a wrench engageable socket 45. The socket member or head 44 is rigidly connected to rotate the drive screw 39 by means of a bolt and nut assembly 46. A thrust collar 47 is positioned on the bearing portion 43 between the socket member 44 and the support member 22. On the other side of the end support member 22 there is also provided a thrust ring 48 supported on the bearing portion 43 and rigidly connected thereto by means of a bolt and nut assembly 49. Thus the drive screw 39 is supported against longitudinal movement by means of the thrust collar 47 and ring 48. A sleeve 50 is journaled on the bearing portion 43 and supports thereon a plurality of concavo-convex spring washers 51 which are supported in an arrangement to provide an effective spring or cushioning assembly disposed between a vertical surface 52 of a follower block 75 and the inner face of the bracket member 31. The follower block 75 includes a threaded bore 76 engaged by the drive screw 39. The arrangement of the concavo-convex springs is also known in the trade as a Belleville spring arrangement the same being disposed in the arrangement shown to provide an effective spring action resulting from thrust forces to which a kingpin is subjected during over the road operation. As best shown in FIG. 4 a locking pin or bolt 54 is provided at one end with a reduced diameter portion 55 and at its other end a larger diameter portion 56. The locking pin 54 is adapted to be reciprocated within a tube 57 which includes an extension 58 projecting outwardly from the side flange 21. The tube 57 is rigidly secured underneath the top plate 12 and includes a short vertical lower slot 59 as best shown in FIGS. 4 and 5. A handle 61 is connected to the larger diameter portion 56 of the locking pin 54, the said handle 61 including a stem 62 which is adapted to be placed within the slot 59. As best shown in FIG. 5, a portion of the large diameter portion 56 adjacent to the stem 62 is provided with an undercut flat recess 63. The tube 57 as best shown in FIG. 6 is also provided with an elongated diagonal guide slot 65 which is in registry with a diagonal slot 66 formed in support structure 64 positioned underneath and projecting downwardly from the top plate 12. During sliding movement of the bolt 54 the stem 62 is guidedly moved in the slot 66. Spaced bracket portions 67 and 68 as best shown in FIG. 4 and 5 are suitably secured to the top plate 12 and project downwardly with respect thereto the same pivotally supporting a flag and indicator 69 having an arm 70 as shown in FIG. 5, which is pivotally connected by means of a pivot pin 71 to the brackets 67 and 68. The axis at the pivot pin 71 is substantially parallel to the axis of the bolt 54. The end of the arm 70 is provided with a cam surface 72 which as best shown in FIG. 5 is adapted to engage the flat portion 63 of the shaft 56. A shield 73 also projects downwardly from the top plate 12 as indicated which as shown in FIG. 6 in the unlocked position hides the flag 69 from view of the operator.

THE OPERATION

Referring now to FIG. 2 the clamping block 26 has been moved to a closed position by means of the drive screw 39. In this position a kinpin (not shown) is securely held between the surfaces 27 and 28 thereby securing a trailer to the trailer hitch 10 in conventional fashion. Also, the locking bolt 54 has been moved from the dotted line position of FIG. 4 to the locking position wherein the diameter portions 55 and 56 are in engagement with their respective bores 34 and 35 of the slide members 25, thus securely locking the slide and clamp assembly in the closed position shown in FIG. 2. Thus, to move the slide assembly and jaw 26 to the position shown in FIG. 2, the drive screw 39 is rotated which in turn causes the follower 75 to exert a thrust against the washers 51 and against the bracket member 31 moving to the right the entire slide assembly and tightly securing the locking jaw in closed position. It should be noted, however, that the bores 34 and 35 are slightly larger than the diameter portions 55 and 56 so that a small or limited amount of movement of the slide memmber 25 (and associated structure) relative to the locking pin 54 is possible. By virtue of the resiliency at the washer arrangement 51 relative to the follower block 75 and the bracket 31, thrust of the trailer kingpin against the jaw 26 permits a limited amount of cushioned movement taking place with washers 51 absorbing the thrust impact thereby relieving the drive screw 39 and associated parts from absorbing the impact, or being subjected to this impact which might thereby seriously damage the drive screw, the associated thrust collars and ring, and the socket head provided at the end of the drive screw 39. Thus a limited amount of thrust (to the left in FIG. 2) on the jaw 26 is absorbed by the washer or resilient cushioned arrangement disclosed.

In this manner disclosed then, excessive thrust forces to the left which frequently occur during over the road operation on railway cars, are relieved by means of the washer assembly which protects the drive screw and associated parts. Yet the effectiveness of the locking bolt, despite its somewhat less than tight fit with respect to the openins 34 and 35, nevertheless prevents any possibility that the jaw will open inadvertently. The action of the locking bolt and its relationship to the flag arrangement 69 is more specifically described in the related application above stated. Briefly, in the locked position shown in FIG. 4, the handle 61 is disposed vertically in the short slot 59 of the tube 57. By moving in this position the flag 69 is pivoted down and is visible to the operator indicating that the bolt has been locked relative to the slide assembly. The flag has its end portion in engagement with the flat recess portion 63 of the bolt. To slide the bolt outwardly from locking engagement with the openings 34 and 35 the flag is manually raised to FIG. 6 position, and the handle 61 is moved to the diagonal position shown in FIG. 6 whereupon the bolt can now be withdrawn with the stem 62 sliding outwardly in the diagonal slots 66 – 72 to the outermost position shown in broken lines in FIG. 4.

What is claimed is:
1. A fifth wheel for connection to the kingpin of a highway trailer including,
   a top plate having a substantially rectangular opening including parallel side walls,
   slide supports supported below said plate adjacent said side walls of said opening,
   a first clamping means having a kingpin receiving surface,
   elongated slide members connected to said first clamping means and slidable on said slide supports,
   second clamping means on said plate including an arcuate wall portion and outwardly diverging walls extending from said arcuate wall portion to said parallel side walls, said arcuate wall portion and said kingpin receiving surface being adapted to confine a kingpin on said top plate,
   a first support member supported on said top plate and extending between said slide members,
   a drive screw extending parallel to said slide members, means on said support member supporting one end of said drive screw, a second support member on said top plate horizontally spaced from said first support member, means connecting the other end of said drive screw for rotative movement to and relative to said second support member, said connecting means including thrust elements on said other end confining said screw against longitudinal movement relative to said second support member, the improvement comprising:

a follower member having a threaded bore rotatably engaged by said drive screw, said follower member during rotation of said screw including means engageable with said slide members for reciprocating said first clamping means relative to said second clamping means, said engageable means including resilient means providing for limited cushioning movement of said slide members and first clamping means relative to said drive screw.

2. The invention in accordance with claim 1, said resilient means including a plurality of concavo-convex washers supported on said drive screw and positioned between said slide members.

3. The invention in accordance with claim 2, said cushioning movement being in a direction tending to move apart said kingpin engageable surface and said kingpin receiving surface.

4. The invention in accordance with claim 1, said slide members being interconnected by transversely extending substantially parallel bracket members having aligned openings, said drive screw extending through said openings, said follower member being positioned adjacent to and engageable with one of said bracket members to exert a thrust thereon, a sleeve supported on said drive screw between said follower member and said other bracket member, said sleeve supporting said resilient means between said follower and said other bracket member.

5. The invention in accordance with claim 4, said drive screw including a cylindrical bearing portion on which said sleeve is supported.

6. The invention in accordance with claim 5, said resilient means including a plurality of stacked springlike washers.

7. The invention in accordance with claim 6, including locking means engageable selectively with said slide members for locking said first clamping means in closed position.

8. The invention in accordance with claim 7, said locking means and slide members in a locked position providing for limited relative movement of said first clamping means and said slide members.

* * * * *